US008849121B2

(12) United States Patent
In De Betou et al.

(10) Patent No.: US 8,849,121 B2
(45) Date of Patent: Sep. 30, 2014

(54) SCHEDULING DEVICE

(75) Inventors: Einar In De Betou, Vallingby (SE); Peter Ohlen, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 162 days.

(21) Appl. No.: 13/061,037

(22) PCT Filed: Sep. 12, 2008

(86) PCT No.: PCT/EP2008/007553
§ 371 (c)(1),
(2), (4) Date: May 10, 2011

(87) PCT Pub. No.: WO2010/028668
PCT Pub. Date: Mar. 18, 2010

(65) Prior Publication Data
US 2011/0200328 A1 Aug. 18, 2011

(51) Int. Cl.
*H04J 14/08* (2006.01)
*H04B 10/00* (2013.01)
*H04L 5/00* (2006.01)
*H04J 3/16* (2006.01)
*H04Q 11/00* (2006.01)
*H04J 3/14* (2006.01)
*H04J 3/06* (2006.01)

(52) U.S. Cl.
CPC ............. *H04L 5/0003* (2013.01); *H04J 3/14* (2013.01); *H04J 3/1694* (2013.01); *H04Q 11/0067* (2013.01); *H04J 3/0682* (2013.01); *H04Q 2011/0064* (2013.01)
USPC ........... 398/98; 398/153; 398/162; 398/167.5

(58) Field of Classification Search
CPC .............................. H04J 14/08; H04W 53/367
See application file for complete search history.

(56) References Cited

U.S. PATENT DOCUMENTS 5,564,084 A 10/1996 Hirasawa
5,912,998 A * 6/1999 Quayle ........................... 385/24
(Continued)

FOREIGN PATENT DOCUMENTS

EP 1 791 275 A1 5/2007
JP 11136216 A * 5/1999 .............. H04J 14/08
(Continued)

OTHER PUBLICATIONS

International Search Report and Written Opinion of the International Searching Authority, PCT Application No. PCT/EP2008/007553, Jun. 10, 2009.

(Continued)

*Primary Examiner* — David Payne
*Assistant Examiner* — Casey Kretzer
(74) *Attorney, Agent, or Firm* — Myers Bigel Sibley & Sajovec, P.A.

(57) ABSTRACT

A control device (13) for scheduling the transmission of signals from a plurality of transmitters (14, 15, 16, 17, 18, 19, 20, 21). The control device (13) comprises an evaluation element (22) arranged to determine the power level of the signals received from each of the transmitters and a scheduling element (23) adapted to determine a transmit schedule comprising the order that the plurality of transmitters should transmit based on the power levels of the signals received from the transmitters (14, 15, 16, 17, 18, 19, 20, 21). A method of operation and a node incorporating the control device is also disclosed.

14 Claims, 2 Drawing Sheets

(56) References Cited

U.S. PATENT DOCUMENTS

| | | | |
|---|---|---|---|
| 6,108,316 A | 8/2000 | Agrawal et al. | |
| 6,985,434 B2* | 1/2006 | Wu et al. | 370/208 |
| 7,020,110 B2* | 3/2006 | Walton et al. | 370/334 |
| 7,245,946 B2* | 7/2007 | Liu | 455/574 |
| 2004/0264492 A1* | 12/2004 | Blahut et al. | 370/442 |
| 2005/0286893 A1* | 12/2005 | Horiuchi et al. | 398/71 |
| 2007/0127923 A1* | 6/2007 | Dalton et al. | 398/71 |
| 2007/0140693 A1* | 6/2007 | Li et al. | 398/67 |
| 2008/0181603 A1* | 7/2008 | Liu et al. | 398/25 |
| 2009/0129781 A1* | 5/2009 | Irie et al. | 398/98 |

FOREIGN PATENT DOCUMENTS

| | | | | |
|---|---|---|---|---|
| JP | 2004015243 A * | 1/2004 | | H04B 10/20 |
| WO | WO 2005/018114 A1 | 2/2005 | | |

OTHER PUBLICATIONS

Fang et al. "An Integrated and Distributed Scheduling and Power Control Algorithms for Maximizing Network Utility for Wireless Multihop Networks" *MILCOM 2003: IEEE Military Communications Conference*, 2:1011-1017 (Oct. 13, 2003).

Nishihara et al. "A Burst-Mode 3R Receiver for 10-Gbit/s PON Systems With High Sensitivity, Wide Dynamic Range, and Fast Response" *Journal of Lightwave Technology* 26(1):99-107 (Jan. 1, 2008).

E. Hugues-Salas, et al. "A 2.5 Gb/s Edge-Detecting Burst-Mode Receiver for GPON Access Networks," Department of Electronic Systems Engineering, University of Essex, ehugue@essex.ac.uk, OSA 1-55752-830-6, 3 pages.

Efraim Rotem, et al. "Performance Analysis of AC-Coupled Burst-Mode Receiver for Fiber-Optic Burst Switching Networks," IEEE Transactions on Communications, vol. 53, No. 5 May 2005, pp. 899-904.

* cited by examiner

SCHEDULING DEVICE

CROSS REFERENCE TO RELATED APPLICATION

This application is a 35 U.S.C. §371 national stage application of PCT International Application No. PCT/EP2008/007553, filed on 12 Sep. 2008, the disclosure and content of which is incorporated by reference herein in its entirety. The above-referenced PCT International Application was published in the English language as International Publication No. WO 2010/028668 A1 on 18 Mar. 2010.

TECHNICAL FIELD

This invention relates to a control device for scheduling the transmission of signals from a plurality of transmitters. This invention also relates to a method for scheduling the transmission of signals. In particular, it relates to a method of controlling burst mode transmission over a passive optical network. This invention also relates to a burst mode receiver including the control device.

BACKGROUND

A passive optical network has a point to multipoint architecture in which a single optical fibre splits to serve multiple end users. A passive optical network comprises an Optical Line Termination node (OLT) contained in the telephone exchange or central office or street side cabinet, for example, at least one optical splitter and an Optical Network Terminal node (ONT) at the end user's premises. Optical fibres connect the optical line termination node to the optical network terminal nodes. Downstream signals are broadcast to all of the optical network terminal nodes that are connected to the optical line termination node via the passive optical network. Upstream signals from the optical network terminal nodes share the medium and are sent using a Time Division Multiple Access communication scheme (TDMA).

A passive optical network provides a flexible platform for providing optical communication capabilities to multiple premises over a geographical area. Thus, the various optical network terminal nodes can be located at different distances from the optical line termination node. This inherently leads to large differences in the attenuation of signals received by the optical line termination node from the different optical network terminal nodes. The optical receiver of the optical line termination node is therefore required to handle a large range of optical input powers, where the maximum difference between a weak and a strong signal typically could be in the range of 15 to 25 dB.

Transmission from the different optical network terminal nodes is made in fairly short bursts, known as burst mode transmission, which makes it important that the optical receiver adapts to the input power variations quickly.

Optical receivers are known that include automatic gain control, which automatically alters the gain of the optical receiver on determining the signal strength. Automatic gain control circuitry has a reaction time which reflects the time it takes for the receiver to respond and settle to a change in input signal strength. There is typically a trade off between a quick reaction time and a large dynamic range that the receiver can adjust over. The dynamic range or burst-to-burst power difference is the maximum difference in the power of successive signal bursts that the automatic gain control circuitry can adjust over in a particular reaction time. If a relatively long time is allowed for the receiver to adjust and settle, the automatic gain control of the receiver can be configured to be effective over a wide dynamic range. However, this configuration leads to inefficient use of the upstream channel of the passive optical network. Alternatively, it may be easier for a receiver to achieve a short reaction time if the dynamic range is constrained to be narrow. However, this limits the range of signal strengths that the receiver can reliably operate over.

A burst mode optical receiver is disclosed in EP 1 791 275 which uses received signal strength indication information from a previous data stream of an optical network unit to adjust an optical receiver to optimize reception of subsequent incoming data streams of the optical network unit based upon received signal strength indication information received from the previous data stream.

A system in which the receiver is reset between bursts and then autonomously adjusts itself to one of two amplification ranges is disclosed in S. Nishihara et al., "A burst-mode 3R receiver for 10-Gbit/s PON systems with high sensitivity, wide dynamic range, and fast response", Journal of Lightwave Technology, vol. 26, issue 1, January 2008.

SUMMARY

According to a first aspect of the invention we provide a control device for scheduling the transmission of signals from a plurality of transmitters comprising an evaluation element arranged to determine the power level of the signals received from each of the transmitters, and a scheduling element adapted to determine a transmit schedule comprising the order that the plurality of transmitters should transmit based on the power levels of the signals received from the transmitters.

This is advantageous as the order in which the transmitters transmit can be determined such that the power levels of the signals received from consecutive transmitters is within a dynamic range of the receiver that receives the signals. Thus, the power levels from the transmitters can be made to vary in a narrow range from burst to burst thereby keeping the reaction time short.

The transmit schedule may define an order in which the transmitters transmit such that the power levels of the signals received from consecutive transmitters is within a predetermined range. In particular, the transmit schedule may define an order such that the change in power levels of the signals received from consecutive transmitters is minimised. Therefore, the control device ensures that a receiver can reliably receive signals of a wide range of power levels while having a short reaction time, as the control device ensures that signals sent by consecutive transmitters is within a narrow dynamic range. Thus, higher transmitter data rates can be reliably used.

The scheduling element may be adapted to assign each of the transmitters to one of a predetermined number of groups based on the signal power of the signal received from each transmitter, each group covering a unique range of signal powers, and wherein the scheduling element determines the transmit schedule such that a subsequent transmitter is selected from the same group as the previous transmitter or an adjacent group.

The evaluation element may be arranged to measure the input power received from each transmitter. Alternatively, the evaluation element may be adapted to determine the power levels from information gathered during a ranging process. This is advantageous as it provides an efficient way for the evaluation element to obtain the information. Thus, during the ranging process in a passive optical network, the optical line termination node must synchronize the upstream transmission from an optical network terminal node with a clock of the optical line termination node. The optical line termination node transmits timestamp messages in the downstream direction which the optical network terminal nodes respond to. The optical line termination node is thus able to determine the round-trip delay between the optical line termination node and the optical network terminal node. Implicitly, this could also give information to the evaluation element about the expected signal power from the optical network terminal node since the signal power is dependent on the physical distance.

The control device may include an instructing element adapted to instruct the transmitters to transmit in accordance with the transmit schedule. The instructing element may be arranged to send information to each transmitter informing it when it is allowed to transmit in accordance with the transmit schedule. Alternatively, the instructing element may be arranged to broadcast the transmit schedule to all of the transmitters. The instructing element may utilise existing protocols to instruct the transmitters, such as GPON or EPON protocols. This is advantageous as the present invention will require minimal overhead to be implemented. Accordingly, the transmitters can be informed easily and efficiently of the transmit schedule.

The scheduling element may specify in the transmit schedule, the length of a preamble portion that each of the transmitters should transmit prior to transmitting a data portion. This is advantageous as the preamble portion can be set to give the adaptive circuitry that controls the gain of the receiver sufficient time to settle before a data portion of the signal is transmitted. This technique can be used to complement the transmit schedule to further improve performance.

The plurality of transmitters may each be an optical network terminal node of a passive optical network and the control device may be associated with an optical receiver of an optical line termination node.

According to a second aspect of the invention we provide a method for scheduling the transmission of signals from a plurality of transmitters, the method including the steps of;
 a) determining the power level of the signals received from each of the transmitters;
 b) determining a transmit schedule comprising the order that the plurality of transmitters should transmit based on the power levels of the signals received from the transmitters.

This is advantageous as the order in which the transmitters transmit can be determined such that the power levels of the signals received from consecutive transmitters is within a dynamic range of the receiver that receives the signals. Thus, the power levels from the transmitters can be made to vary in a narrow range from burst to burst thereby keeping the reaction time short.

The method may include a step c) after step b) comprising instructing the transmitters to transmit in accordance with the transmit schedule. Thus, the transmitters can be automatically configured to transmit in a particular order so that the capabilities of a receiver can be utilised efficiently.

Step b) may comprise defining an order in which the transmitters transmit such that the power levels of the signals received from consecutive transmitters is within a predetermined range. This allows a low reaction time to be maintained.

According to third aspect of the invention we provide a node comprising a receiver for receiving signals from a plurality of transmitters and a control device for scheduling the transmission of signals from the plurality of transmitters comprising an evaluation element arranged to determine the power level of the signals received from each of the transmitters, and a scheduling element adapted to determine a transmit schedule comprising the order that the plurality of transmitters should transmit based on the power levels of the signals received from the transmitters.

The node is advantageous as it can support high data rates due to the receiver being able to adapt quickly to changes in signal strength from the plurality of transmitters.

According to a fourth aspect of the invention we provide a network including a node as defined in the third aspect of the invention.

The evaluation element may be adapted to determine the power levels from information gathered during a ranging process of the network. This is advantageous as it provides an efficient way for the evaluation element to obtain the information. The ranging process occurs at system start-up or when new nodes are introduced to the network, to determine operating parameters and settings of the nodes. The evaluation element may be adapted to measure the power level of signals received from each transmitter during the ranging process.

BRIEF DESCRIPTION OF THE DRAWINGS

There now follows by way of example only a detailed description of an embodiment of the present invention with reference to the accompanying drawings in which.

DETAILED DESCRIPTION

Figure 1:
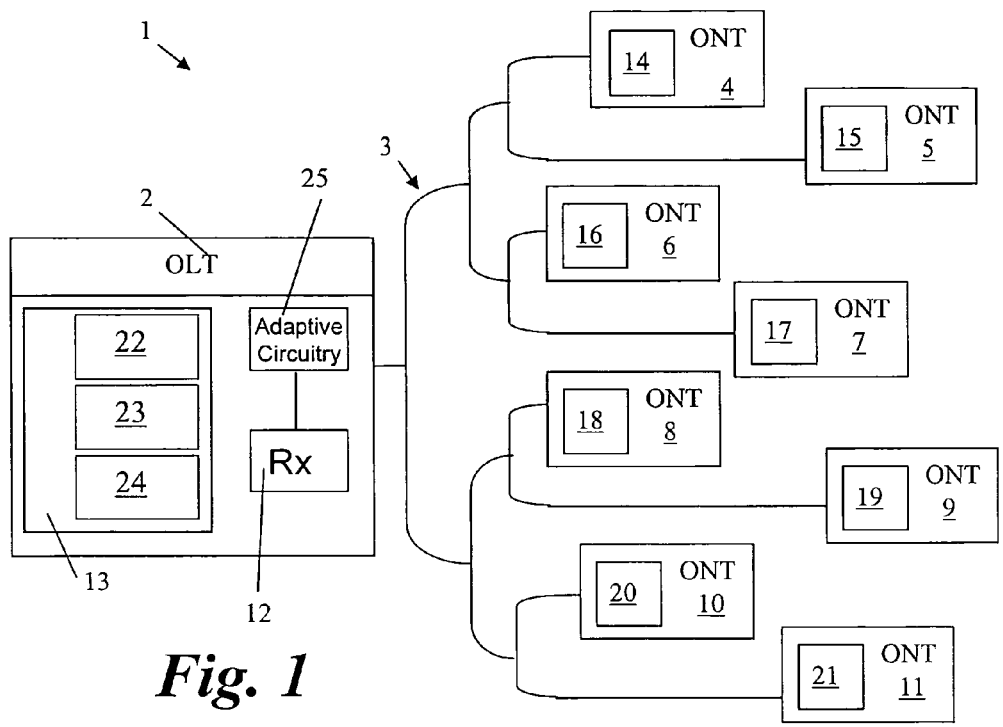
FIG. 1 shows a passive optical network incorporating an embodiment of the control device.

The present invention has particular application in passive optical networks and for integration with a receiver of an optical line termination node. FIG. 1 shows a passive optical network 1 including an optical line termination node 2 connected via branching communication lines 3 to a plurality of optical network terminal nodes 4, 5, 6, 7, 8, 9, 10, 11. The optical line termination node 2 includes an optical burst mode receiver 12 and a control device 13. The optical network terminal nodes 4, 5, 6, 7, 8, 9, 10, 11 include optical transmitter 14, 15, 16, 17, 18, 19, 20, 21.

The passive optical network 1 of FIG. 1 comprises an ITU-T G.984 compliant Gigabit passive optical network system, supporting Class A, B and C budgets. It will be appreciated that the present invention has application in other types of network.

The control device 13 includes an evaluation element 22, a scheduling element 23 and an instructing element 24. The control device 13 is integrated with the receiver 12 of the optical line termination node 2. It will be appreciated by those skilled in the art that the integration of the control device with the receiver can be implemented in several ways. For example, it would be possible to implement the control device and receiver as a multi-chip design, where the optical receiver is implemented as a chain of semiconductor devices such as a PIN diode or APD, a trans-impedance amplifier, a limiting amplifier, burst-mode clock and data recovery element and a medium access controller and framer. The control device 13 could be integrated as a part of a medium access controller or a framer in a field programmable gate array or application-specific integrated circuit. Alternatively, there could be a "logical connection" between the semiconductor devices in the receiver chain where information could be exchanged.

The receiver 12 of the optical line termination node 2 includes adaptive circuitry 25 that adjusts the gain of the optical receiver 12 to suit the power level of the signals being received. It will be appreciated that the decision threshold of the receiver may also be adapted by the adaptive circuitry. However, for simplicity, only the gain will be mentioned hereinafter. The adaptive circuitry 25, when adjusting the gain of the receiver 12 requires an amount of time to settle on a particular level. This time is known as the reaction time. The adaptive circuitry 25 also has a dynamic range, which is the difference in power levels that the circuitry can effectively adapt to, within a specific reaction time. An increase in the dynamic range typically results in a longer reaction time and vice-versa.

The evaluation element 22 is arranged to measure the power level of the signals received from each transmitter 14, 15, 16, 17, 18, 19, 20, 21. Alternatively, the evaluation element 22 may be adapted to determine the power levels from information gathered during the ranging process. During the ranging process in a passive optical network 1, the optical line termination node 2 must synchronize the upstream transmission from an optical network terminal node with a clock of the optical line termination node 2. The optical line termination node 2 transmits timestamp messages in the downstream direction which the optical network terminal nodes respond to. The optical line termination node 2 is thus able to determine the round-trip delay between the optical line termination node 2 and the optical network terminal nodes 4, 5, 6, 7, 8, 9, 10, 11. Implicitly, this could also give information to the evaluation element 22 about the expected signal power from the optical network terminal nodes since the signal power is dependent on the physical distance.

The scheduling element 23 receives the power level information from the evaluation element 22 and determines a transmit schedule. The transmit schedule is arranged such that the differences between power levels of consecutive signal bursts is kept to a minimum. In particular, the difference between power levels of consecutive signal bursts is kept within a predetermined range that corresponds to the dynamic range of the adaptive circuitry 25. Thus, the transmit schedule allows the dynamic range to be narrow, which results in a short reaction time, thereby increasing the performance of the upstream communication of the passive optical network 1. Further, the scheduling element 23 may take into consideration the bandwidth needs of each optical network terminal node when determining the transmit schedule. In particular, the scheduling element 23 may, in addition to keeping that the power difference between bursts is low, ensure that Quality of Service is not affected. In particular, the scheduling element may give an optical network terminal node that needs to transmit time sensitive information, such as Voice over IP, a transmit timeslot at a particular time or more frequent timeslots. Accordingly, each optical network terminal node may inform the optical line termination node of its instantaneous bandwidth requirement and Quality of Service requirement so that the scheduling element 23 can reduce the power difference between bursts while maintaining an effective passive optical network. The scheduling element 23 may, in addition to determining the order in which the transmitters of the optical network terminal nodes should transmit, also determined the length of a preamble portion that the transmitter should transmit prior to a data portion, as discussed in more detail below.

The instructing element 25 is adapted to inform the optical network terminal nodes of the transmit schedule derived by the scheduling element 23. Thus, the instructing element 25 may send a schedule message to each optical network terminal node specifying when it is allowed to transmit. Alternatively, the instructing element 25 may send a transmit schedule message containing the transmit schedule. Thus, each optical network terminal node must then determine from the transmit schedule when it is allowed to transmit.

Figure 2:
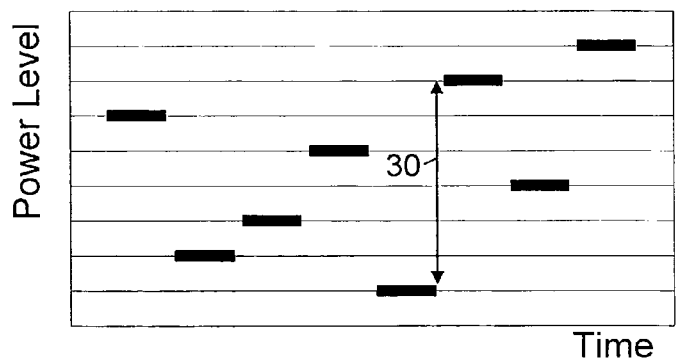
FIG. 2 shows a graph of the power levels of signals received over time.

A graph of the power levels of signal bursts over time in a typical passive optical network is shown in FIG. 2. The graph shows the power levels of signals received from the transmitters of the eight optical network terminal nodes 4, 5, 6, 7, 8, 9, 10, 11 by the optical line termination node receiver 12. Thus, there are eight different power levels mainly due to the geographical distance that the optical network terminal nodes are from the optical line termination node. The gain of the receiver has to change over a wide range, shown as change 30, between signal bursts. Thus, the dynamic range of the adaptive circuitry 25 must be set to be large, which limits the performance of the passive optical network due to the resulting long reaction time.

Figure 3:
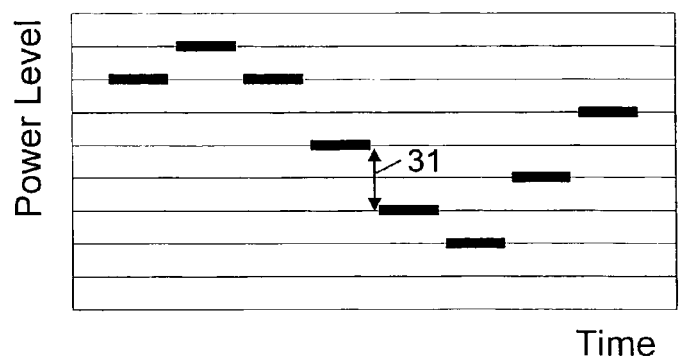
FIG. 3 shows a graph of the power levels of signals received over time transmitted in accordance with a transmit schedule.

However, by instructing the transmitters of the optical network terminal nodes 4, 5, 6, 7, 8, 9, 10, 11 to transmit in accordance with the transmit schedule, the change in power levels between successive bursts from the transmitters can be reduced, as shown in FIG. 3. In FIG. 3, the largest change in power level between successive bursts is shown as change 31, which is smaller than power level change 30 of FIG. 2. Thus, the dynamic range of the adaptive circuitry 25 can be small thereby resulting in a short reaction time. This results in efficient upstream communication over the passive optical network.

Figure 4:
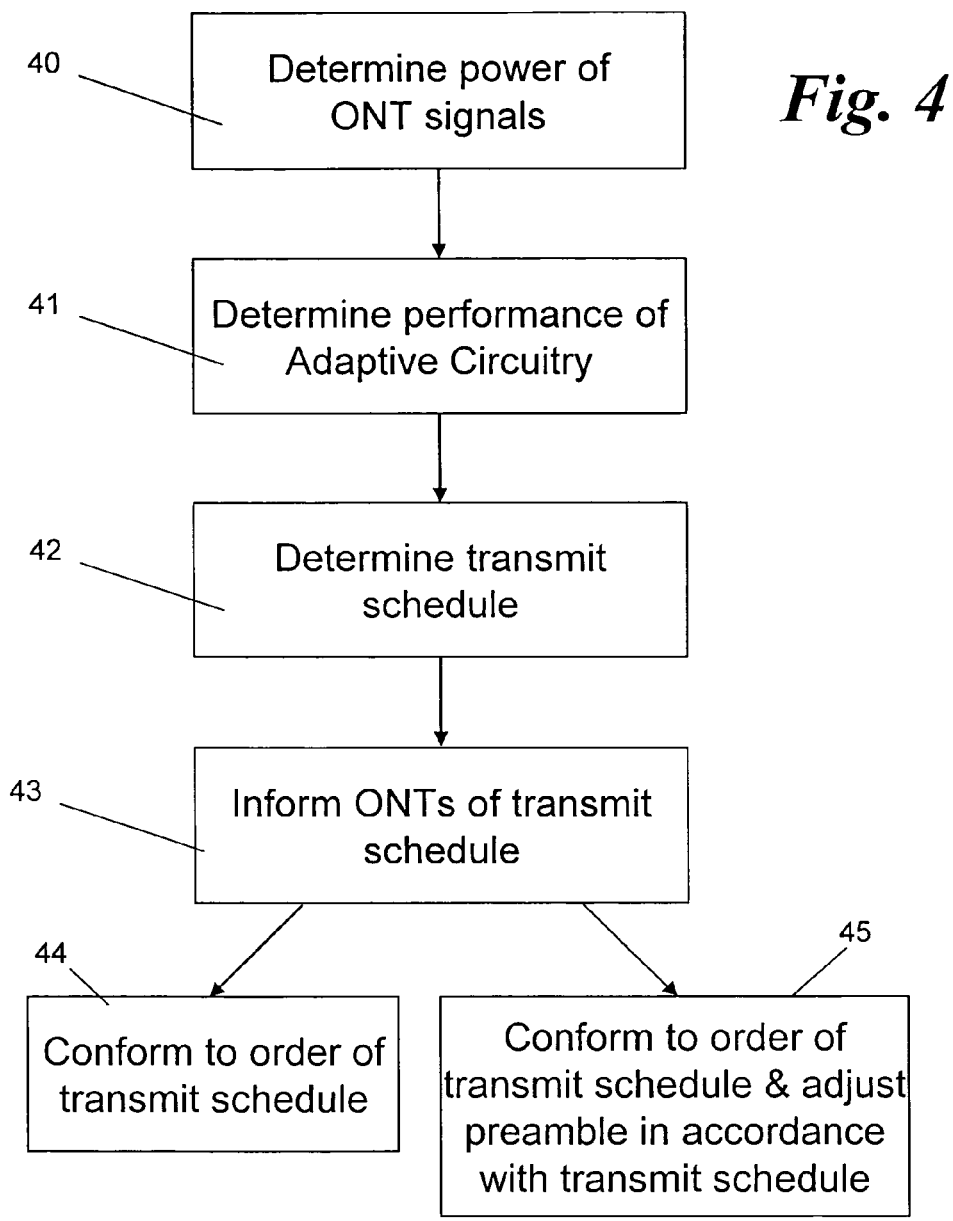
FIG. 4 shows a flow chart illustrating an embodiment of the method of the invention.

FIG. 4 shows a flow chart illustrating an embodiment of the method of the invention. At step 40, the evaluation element 22 determines the power levels of the signals received from each of the optical network terminal nodes 4, 5, 6, 7, 8, 9, 10, 11. This may be achieved by measuring the received signal power from each optical network terminal node or by retrieving information gathered during the ranging process, as discussed above.

Step 41 involves the evaluation element 22 determining the performance of the adaptive circuitry 25. This involves determining the dynamic range of the adaptive circuitry 25 to achieve a reaction time that is appropriate for the upstream communication over the passive optical network. This information determined by the evaluation element is passed to the scheduling element 23. Alternatively, the performance of the adaptive circuitry may be pre-programmed or the control device may be arranged to minimise the dynamic range required.

Step 42 comprises the scheduling element 23 determining the transmit schedule. In the present embodiment, the transmit schedule comprises the order that the optical network terminal nodes should transmit. It is determined such that the difference in power between successive signal bursts is kept within the dynamic range of the adaptive circuitry 25. The scheduling element 23 may ensure the difference in power between successive bursts is kept within a predetermined range or it may attempt to minimise the power level differences between bursts.

In an alternative embodiment, the transmit schedule may be derived differently. In current passive optical network systems, when each of the optical network terminal nodes transmit, they first send a preamble portion followed by a data portion. This preamble portion is set to a fixed number of bits for all bursts. However, in this alternative embodiment, the transmit schedule may define the length of the preamble for each of the optical network termination nodes. Thus, for a given order of transmission, the preamble of a burst which has a large difference in power from its preceding burst is set to have a long preamble in the transmit schedule. Likewise, the preamble of a burst which has a small difference in power from its preceding burst is set to have a short preamble in the transmit schedule. By determining the length of the preamble based on the difference in power between a burst from one optical network terminal node and a preceding burst from a second optical network terminal node, gives the adaptive circuitry 25 a longer reaction time until the data portion of the burst is received. Thus, the adaptive circuitry can use the additional time provided by a longer preamble to settle on a particular gain required for a signal burst that differs greatly in power from the preceding burst. The transmit schedule therefore defines the length of the preamble portion for each optical network terminal node based on the power difference of the node that transmits before it in addition to the scheduling of a particular transmission order as discussed above.

Thus, the transmit schedule defines the order in which the optical network terminal nodes should transmit and define the length of the preamble portion for each optical network termination nodes. The transmit order and the length of the preamble being set to minimize the dynamic range that the adaptive circuitry has to operate over to obtain a short reaction time. This leads to an efficient use of the upstream channel over the passive optical network 1.

Step 43 involves the instructing element 24 instructing the optical network terminal nodes to adhere to the transmit schedule. Thus, depending on the transmit schedule, the instructing element 24 may specify the time window that a particular optical network terminal node can transmit so that the nodes transmit in a particular order. Alternatively, the instructing element 24 may inform each of the optical network terminal nodes of the length of the preamble portion that they should use when transmitting. As discussed above, the instructing element 24 may inform each of the optical network terminal nodes of the time window and the length of the preamble portion they should use.

Depending on the form of the transmit schedule, the method proceeds to one of steps 44 or 45. In step 44, the optical network terminal nodes transmit their signal bursts in the order defined by the transmit schedule. In step 45, the optical network terminal nodes transmit their signal bursts in the order defined by the transmit schedule and each node transmits a preamble portion of a length defined by the transmit schedule before it transmits the data portion.

In a further example, the optical network terminal nodes are divided in five groups; each group covering optical network terminal nodes located at a differential range of 5 dB. The scheduling element 23 operates to make sure that the dynamic change in input power levels to the optical line termination node receiver 12 is kept within a narrow range, for example 10 dB. Classification of the optical network terminal nodes 4, 5, 6, 7, 8, 9, 10, 11 into the groups is based on the power level information obtained by the evaluation element 22. The predetermined groups are defined as follows;

Group A would cover optical network terminal nodes at a distance (link budget) of 5-10 dB from the optical line termination node.

Group B would cover optical network terminal nodes at a distance (link budget) of 10-15 dB from the optical line termination node.

Group C would cover optical network terminal nodes at a distance (link budget) of 15-20 dB from the optical line termination node.

Group D would cover optical network terminal nodes at a distance (link budget) of 20-25 dB from the optical line termination node.

Group E would cover optical network terminal nodes at a distance (link budget) of 25-30 dB from the optical line termination node.

The scheduling element 23 ensures that successive signal bursts are allocated either within the same group of optical network terminal nodes, or to an optical network terminal node from an adjacent group (i.e. an optical network terminal node burst from group A would be followed by a burst from a node in group B; a burst from a node in group B would be followed by a burst from a node in group C and so on).

Typically the optical network terminal nodes in the system are serviced in a once per 125 μs basis, and the granularity of the scheduling entities is fine (T-CONTs). It will be appreciated by those skilled in the art that the control device of the invention can operate to derive a transmit schedule that meets the needs of the receiver without effecting the quality of service experienced in the upstream direction.

Thus, the control device 13 makes it possible for a passive optical network utilising burst mode receivers to have performance tuned for fast reaction times only, instead of balancing the conflicting requirements on both fast reaction times and wide dynamic range. This enables support for higher upstream data rates than what is commercially available today (i.e. 2.5-10 Gbit/s). Further, a passive optical network utilising the control device 13 is flexible as a single burst mode receiver 12 can support several different link budgets.

Thus, the control device 13 can also decrease the needed protocol overhead in a passive optical network. In particular, the preamble portion is part of the protocol overhead, and by using this scheduling technique, the preamble can be made shorter, thereby making better use of the transmission bandwidth.

The control device 13 is implemented as software, although it could also be implemented in hardware using field programmable gate arrays or application specific integrated circuits.

The invention claimed is:

1. A control device for scheduling the transmission of signals from a plurality of transmitters, the control device comprising:
   an evaluation element arranged to determine the power level of signals received from each of the plurality of transmitters, and
   a scheduling element adapted to determine a transmit schedule, comprising an order that the plurality of transmitters will transmit relative to one another, based on the power levels of the signals received from the plurality of transmitters,
   wherein the scheduling element is further adapted to determine the transmit schedule to define the order in which the plurality of transmitters will transmit such that differences between the power levels of the signals received from consecutive ones of the plurality of transmitters according to the transmit schedule are within a predetermined range of a receiver associated with the control device,
   wherein the scheduling element is further adapted to assign each of the transmitters to one of a predetermined number of groups based on the signal power of the signal received from each transmitter, each group covering a unique range of signal powers, and wherein the scheduling element determines the transmit schedule such that a subsequent transmitter is selected from the same group as the previous transmitter or an adjacent group.

2. A control device according to claim 1, wherein the scheduling element is further adapted to determine the transmit schedule to define the order in which the plurality of transmitters will transmit such that the differences between the power levels of the signals received from the consecutive ones of the plurality of transmitters are minimized.

3. A control device according to claim 1, wherein the evaluation element is arranged to measure the input power received from each transmitter.

4. A control device according to claim 1, wherein the evaluation element is adapted to determine the power levels from information gathered during a ranging process.

5. A control device according to claim 1, further comprising:
an instructing element adapted to instruct the transmitters to transmit in accordance with the transmit schedule.

6. A control device according to claim 5, wherein the instructing element utilizes existing protocols to instruct the transmitters.

7. A control device according to claim 1, wherein the scheduling element specifies in the transmit schedule, the length of a preamble portion that each of the transmitters should transmit prior to transmitting a data portion.

8. A control device according to claim 1, wherein the plurality of transmitters comprise optical network terminal nodes of a passive optical network and the receiver comprises an optical receiver of an optical line termination node.

9. A control device according to claim 1, wherein:
the predetermined range of the receiver associated with the control device corresponds to a constrained dynamic range of the receiver associated with the control device; and
the scheduling element is further adapted to determine the transmit schedule to define the order in which the plurality of transmitters will transmit such that the differences between the power levels of the signals received from the consecutive ones of the plurality of transmitters are constrained to provide the constrained dynamic range of the receiver associated with the control device.

10. A method performed by a control device for scheduling the transmission of signals from a plurality of transmitters, the method including the steps of:
a) determining the power level of signals received from each of the plurality of transmitters; and
b) determining a transmit schedule, comprising an order that the plurality of transmitters will transmit relative to one another, based on the power levels of the signals received from the plurality of transmitters,
wherein step b) comprises defining the order in which the plurality of transmitters will transmit such that differences between the power levels of the signals received from consecutive ones of the plurality of transmitters according to the transmit schedule are within a predetermined range of a receiver associated with the control device,
wherein step b) further comprises assigning each of the transmitters to one of a predetermined number of groups based on the signal power of the signal received from each transmitter, each group covering a unique range of signal powers, and
wherein step b) further comprises determining the transmit schedule such that a subsequent transmitter is selected from the same group as the previous transmitter or an adjacent group.

11. A method according to claim 10, further comprising after step b):
c) instructing the transmitters to transmit in accordance with the transmit schedule.

12. A node for use in a communications network, the node comprising:
a receiver configured to receive signals from a plurality of transmitters; and
a control device configured to schedule the transmission of signals from the plurality of transmitters, wherein the control device comprises:
an evaluation element arranged to determine the power level of the signals received from each of the plurality of transmitters; and
a scheduling element adapted to determine a transmit schedule comprising an order that the plurality of transmitters will transmit relative to one another, based on the power levels of the signals received from the plurality of transmitters,
wherein the scheduling element is further adapted to determine the transmit schedule to define the order in which the plurality of transmitters will transmit such that differences between the power levels of the signals received from consecutive ones of the plurality of transmitters according to the transmit schedule are within a predetermined range of the receiver,
wherein the scheduling element is further adapted to assign each of the transmitters to one of a predetermined number of groups based on the signal power of the signal received from each transmitter, each group covering a unique range of signal powers, and
wherein the scheduling element determines the transmit schedule such that a subsequent transmitter is selected from the same group as the previous transmitter or an adjacent group.

13. A communications network comprising a node that is configured to operate as defined in claim 10.

14. A communications network comprising a node that is configured to operate as defined in claim 12, wherein the evaluation element is adapted to determine the power levels from information gathered during a ranging process of the network.

* * * * *